United States Patent Office 3,438,955
Patented Apr. 15, 1969

3,438,955
NONYELLOWING ANTIELECTROSTATIC MOLDED
MASSES AND MOLDED BODIES
Konrad Rombusch and Friedrich Seifert, Marl, Germany, assignors to Chemische Werke Huls Aktiengesellschaft, Marl, Germany, a corporation of Germany
No Drawing. Filed Sept. 29, 1966, Ser. No. 583,502
Claims priority, application Germany, Oct. 5, 1965, C 37,052
Int. Cl. C08d *3/04;* C09k *3/16*
U.S. Cl. 260—93.7                                    2 Claims It is a well known fact that plastics, especially if prepared from polyolefines, have the tendency to attract large amounts of dust particles during storage and use due to electrostatic charge with the result that their industrial use is greatly impaired.

Several means have been proposed already to overcome this problem.

One of the best solutions is the proposal to admix to the molded masses and molded bodies, prepared from polyolefines, with or without standard additives, .01 to 4 percent by weight relative to the polyolefine of one or more alkyloxypropylamines of the formula

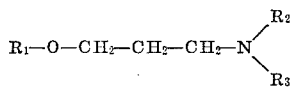

or to coat the molded masses or molded bodies therewith. In the formula $R_1$ represents an alkyl, alkenyl, alkylcycloalkyl, alkylaryl, aryl or alkenylaryl group with 6 to 25 carbon atoms in the alkyl or the alkenyl group; $R_2$ and $R_3$ each represents a hydrogen atom or an alkyl or alkenyl group with 1 to 5 carbon atoms or the group $(C_xH_{2x}O)_nH$ in which $x=2$ or 3 and $n=1$ to 10; either alone or in mixture with other compounds having an antielectrostatic effect.

Suitable polyolefines which can be made antielectrostatic by such additives are for example high and low pressure polymers of ethylene, propylene, butene-(1), pentene-(1) and the like, especially polyethylenes with molecular weights ranging from 20,000 to 150,000 polypropylenes with molecular weights ranging from 100,000 to 800,000, polybutenes-(1) with molecular weights ranging from 300,000 to 3,000,000, polypentenes-(1) as well as copolymers and polymer mixtures thereof.

Suitable alkyloxypropylamines of the formula

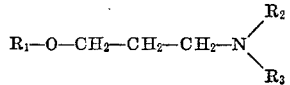

are those in which $R_1$ is a saturated or unsaturated, straight chain or branched alkyl, or alkylcycloalkyl or alkylaryl group with 6 to 25, preferably 8 to 14, carbon atoms in the alkyl group, or an aryl group. Suitable for group $R_1$ are for example the hexyl, n-octyl, ethylhexyl, n-nonyl, i-nonyl, n-dodecyl, n-tetradecyl, i-tetradecyl, hexadecyl, oleyl, n-octadecyl, nonylcyclohexyl, i-nonylphenyl, n-dodecylphenyl, i-dodecylphenyl, n-octadecylphenyl group or mixtures thereof such as a mixture of $C_{12}$–$C_{18}$-aliphatic alcohols. Preferred are the 2-ethylhexyl, decyl, undecyl, n-dodecyl, tridecyl and tetradecyl groups.

If $R_2$ and $R_3$ both represent alkyl groups with 1 to 5 carbon atoms, the methyl and ethyl groups are particularly suitable. If $R_2$ and $R_3$ represent the group $(C_xH_{2x}O)_nH$, compounds with $x=2$ and $n$ about 2 are preferred.

The above described alkyloxypropylamines which will make the molded masses and molded bodies outstandingly antielectrostatic have the tendency however to become slightly but noticeably yellow if subjected to higher temperatures for longer periods of time and the molded masses will show this discoloration.

It has been found that it is possible to eliminate to a great extent the yellowing if the antielectrostatic masses contain as an admixture .01 to .5 percent by weight, relative to the polyolefine, of an alkali metal salt of an alkylsulfonic acid with 8 to 20 carbon atoms in the alkyl group.

It was not to be expected that the alkali metal salts of alkylsulfonic acids, in the small quantities specified, would satisfactorily stabilize the alkyloxypropylamines involved without any adverse influence on the antistatic effectiveness of the admixed alkyloxypropylamines since such adverse influences do occur in case of other substances which have a stabilizing effect, for example 4,4′-butylidene-bis-(6-t-butyl-m-cresol).

It was found that suitable stabilizers for the amines listed above are, for example:

Sodium n-dodecylsulfonate,
Sodium $C_{12}$–$C_{16}$-alkylsulfonate,
Potassium $C_{10}$–$C_{14}$-alkylsulfonate,
Lithium n-octadecylsulfonate,
Sodium $C_{12}$–$C_{14}$-alkylsulfonate.

These compounds can be prepared for example by sulfochlorination of the corresponding hydrocarbons and subsequent reaction of the sulfonyl chlorides with alkali.

Normally, approximately 1 part of sulfonate to 1 part of amine will suffice for the stabilization so that only .3 to 1 part of sulfonate to 100 parts of polyolefine are needed because the quantity of alkyloxypropylamine required for the antielectrostatic effect usually will not exceed 1 part to 100 parts of polyolefine.

The stabilizers are mixed with the antielectrostatic substances and the mixture incorporated in the polyolefines. This incorporation can be accomplished in various ways, for example by converting the additives and the polyolefine powder into a homogeneous mass by use of a mixer. Any commercially available rapid mixer can be employed for this purpose.

It is also possible to add to the polyolefine initially a higher percentage of the mixed antistatic substance and the stabilizer than is required and to lower the ratio subsequently as desired by the addition of more polyethylene.

It is also feasible to dissolve the mixture comprising the antielectrostatic substance and the stabilizer in a suitable organic solvent, or to disperse, suspend or emulsify it and then to add, under thorough stirring, the solution, dispersion, suspension or emulsion to the polyethylene powder. The solvent is then removed, for example by distillation. A mixture of methanol and water is a particularly suitable solvent for such purpose but any other easily distilled solvent can be employed also.

Furthermore, it is possible to accomplish the incorporation of the mixture into the polyethylene directly on rollers or, in case of injection molding, within an extruder.

The incorporation and homogenizing can also be carried out simultaneously with the admixture of other additives normally used in the manufacture of plastics such as pigments, lubricants, plasticizers and fillers.

The homogeneous dry mixtures of polyolefines and antielectrostatic substances and stabilizers can be transformed in a manner known per se, into objects as desired, for example into foils by blowing and rolling, into filaments by drawing, or into other articles by injection molding or pressing.

For the purpose of testing the stabilizing effect of the additives, the molded objects containing the alkoxypropylamines and alkylsulfonates, formed at 290° C., are subjected to a temperature of 100° C. in a circulating-airchamber. The yellowing observed over and after a certain period of time is classified numerically from 1 to 10 as follows:

(1) No yellowing when compared with an O-specimen containing neither amines nor an amine stabilizer;
(2) Hardly noticeable yellowing;
(3) Very slightly yellowish;
(4) Slightly yellowish;
(5) Yellowish;
(6) Yellow;
(7) Yellow-brown;
(8) Brown;
(9) Deep brown;
(10) Very dark brown.

The antielectrostatic property of the described mixtures is determined by measuring the surface resistivity at 40% humidity in atmospheric air and a temperature of 22° C. by rubbing the molded body vigorously ten times with a woolen cloth and holding the rubbed body over crushed cigarette ashes at a distance of 1 cm. The test is considered to be positive if the molded body fails to attract any ash particles.

We claim:

1. A nonyellowing antielectrostatic molded mass consisting essentially of a polyolefine and .01 to 4 percent by weight, relative to the polyolefine of at least one alkyloxypropylamine of the formula

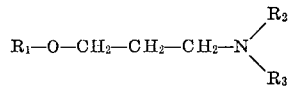

in which $R_1$ represents a member selected from the group consisting of alkyl, alkenyl, alkylcycloalkyl, aryl, alkylaryl and alkenylaryl groups with 6 to 25 carbon atoms in the alkyl and alkenyl groups; $R_2$ and $R_3$ each represents a member selected from the group consisting of hydrogen and alkyl and alkenyl groups with 1 to 5 carbon atoms and the group $(C_xH_{2x}O)_nH$ with $x=$one of the numbers 2 and 3 and $n=1$ to 10 and .1 to 3.0 percent by weight, relative to the polyolefine, of an alkali metal alkylsulfonate with 8 to 20 carbon atoms in the alkyl group.

2. A nonyellowing molded mass as defined in claim 1 in which the alkyloxypropylamine and the alkali metal alkyl sulfonate are intimately mixed with the polyolefine.

References Cited

FOREIGN PATENTS 820,541    9/1959    Great Britain.

JOSEPH L. SCHOFER, *Primary Examiner.*

L. EDELMAN, *Assistant Examiner.*